(12) United States Patent
Lang et al.

(10) Patent No.: US 11,092,222 B2
(45) Date of Patent: Aug. 17, 2021

(54) DIFFERENTIAL DEVICE AND VEHICLE HAVING SAID DIFFERENTIAL DEVICE

(71) Applicant: ZF Friedrichshafen AG, Friedrichshafen (DE)

(72) Inventors: Martin Lang, Wegscheid (DE); Thomas Auer, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/347,700

(22) PCT Filed: Oct. 4, 2017

(86) PCT No.: PCT/EP2017/075099
§ 371 (c)(1),
(2) Date: May 6, 2019

(87) PCT Pub. No.: WO2018/082853
PCT Pub. Date: May 11, 2018

(65) Prior Publication Data
US 2019/0257399 A1   Aug. 22, 2019

(30) Foreign Application Priority Data
Nov. 7, 2016 (DE) .................... 10 2016 221 722.4

(51) Int. Cl.
*F16H 48/08*   (2006.01)
(52) U.S. Cl.
CPC ....... *F16H 48/08* (2013.01); *F16H 2048/085* (2013.01)

(58) Field of Classification Search
CPC ..... F16H 48/38; F16H 48/08; F16H 2048/085
See application file for complete search history.

(56) References Cited

U.S. PATENT DOCUMENTS

| | | | | |
|---|---|---|---|---|
| 2,126,653 A | * | 8/1938 | Murray | F16H 48/08 475/241 |
| 3,327,562 A | * | 6/1967 | Holdeman | F16H 48/22 475/235 |

(Continued)

FOREIGN PATENT DOCUMENTS

| | | | |
|---|---|---|---|
| DE | 10051355 A1 | 8/2002 | |
| DE | 10212671 A1 * | 10/2003 | F16H 48/08 |

(Continued)

OTHER PUBLICATIONS

International Search Report (English Translation) PCT/EP2017/075099, dated Jan. 9, 2018. (3 pages).

*Primary Examiner* — Sherry L Estremsky
(74) *Attorney, Agent, or Firm* — Dority & Manning, P.A.

(57) ABSTRACT

A differential 1 includes a differential spider 5 and a differential housing 3. The differential spider 5 includes a bolt body 6 with four bolt sections 7a, 7b, 7c, 7d and four bevel gears 8a, 8b, 8c, 8d. The bevel gears 8a, 8b, 8c, 8d are mounted on the bolt sections 7a, 7b, 7c, 7d. The differential spider 5 is arranged in the differential housing 3. The differential housing 3 defines an axis of rotation R. The bolt body 6 includes a main differential bolt 10 including two bolt sections 7c, 7d and two differential bolts 9a, 9b, each of which includes a bolt section 7a, 7b. The main differential bolt 10 includes a locating section 11. The differential bolts 9a, 9b are accommodated in the locating section 11.

14 Claims, 17 Drawing Sheets

(56) References Cited

U.S. PATENT DOCUMENTS

| | | | | |
|---|---|---|---|---|
| 3,593,595 | A * | 7/1971 | Taylor | F16H 48/08 475/230 |
| 3,894,447 | A * | 7/1975 | Michael | F16H 48/08 475/230 |
| 3,974,717 | A * | 8/1976 | Breed | F16H 48/08 475/86 |
| 4,577,530 | A * | 3/1986 | Hickey | F16H 48/08 411/356 |
| 4,722,244 | A * | 2/1988 | Tsuchiya | F16H 48/08 475/221 |
| 5,647,814 | A * | 7/1997 | Krisher | F16H 48/08 475/230 |
| 5,980,417 | A * | 11/1999 | Wopshall, Jr. | F16H 48/08 475/230 |
| 6,053,835 | A * | 4/2000 | Shibazaki | F16H 48/08 475/160 |
| 6,354,978 | B1 * | 3/2002 | Brackin | F16H 48/08 475/234 |
| 7,025,702 | B2 * | 4/2006 | Saito | F16H 48/08 475/160 |
| 7,081,065 | B2 * | 7/2006 | Sudou | F16H 48/08 475/230 |
| 7,591,751 | B2 * | 9/2009 | Sudorowski | F16H 48/08 475/230 |
| 7,648,438 | B2 * | 1/2010 | Corless | F16H 48/08 475/230 |
| 7,695,392 | B2 * | 4/2010 | Isken, II | F16H 48/08 475/230 |
| 8,083,628 | B2 * | 12/2011 | Soybel | F16H 48/11 475/160 |
| 9,534,679 | B2 * | 1/2017 | Ch | F16H 48/40 |
| 10,465,783 | B2 * | 11/2019 | Gianone | F16H 48/08 |
| 2008/0032847 | A1 | 2/2008 | Chludek et al. | |
| 2014/0213407 | A1 * | 7/2014 | Fisher | F16H 48/42 475/220 |
| 2016/0208899 | A1 * | 7/2016 | Fisher | F16H 48/38 |
| 2017/0191556 | A1 | 7/2017 | Cochren et al. | |
| 2018/0128362 | A1 * | 5/2018 | Martin | F16H 48/40 |

FOREIGN PATENT DOCUMENTS

| | | | |
|---|---|---|---|
| DE | 10212671 A1 | 10/2003 | |
| DE | 202004016178 U1 | 3/2005 | |
| DE | 102014221408 A1 | 4/2016 | |
| EP | 1085239 A2 * | 3/2001 | F16H 48/08 |
| FR | 2879275 A1 * | 6/2006 | F16H 48/08 |
| GB | 971198 A * | 9/1964 | F16H 48/08 |
| WO | WO 2007085847 A1 | 8/2007 | |
| WO | WO 2013036551 A1 | 3/2013 | |
| WO | WO 2014116802 A1 | 7/2014 | |

* cited by examiner

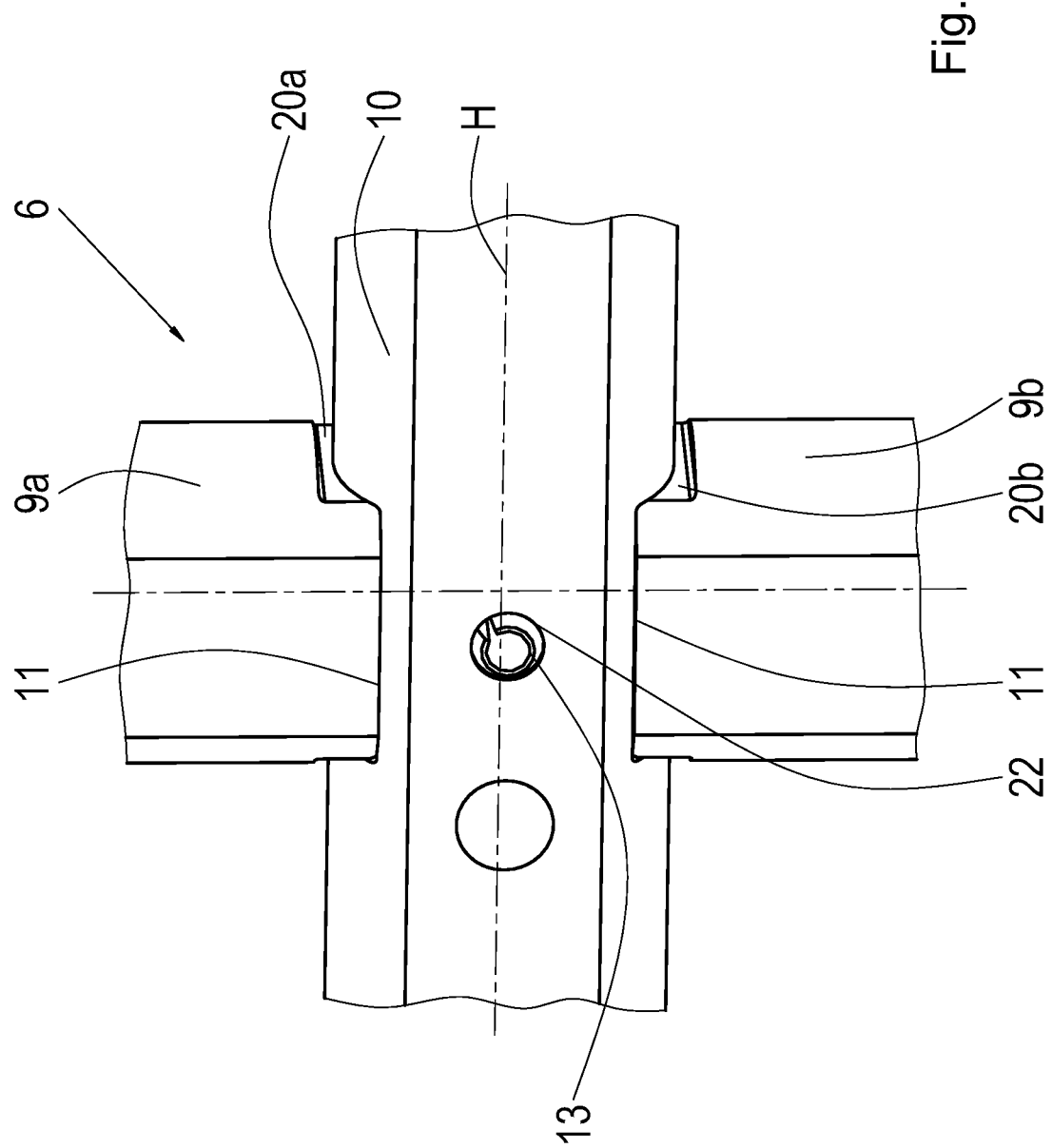

DIFFERENTIAL DEVICE AND VEHICLE HAVING SAID DIFFERENTIAL DEVICE

FIELD OF THE INVENTION

The invention relates generally to a differential device that includes a differential spider. The differential spider includes a bolt body encompassing four bolt sections and four bevel gears, wherein the bevel gears have been put onto the bolt sections, and also includes a differential housing. The differential spider is arranged in the differential housing, and the differential housing defines an axis of rotation. The invention also relates to a vehicle with such differential device.

BACKGROUND

Differentials are often utilized in vehicles for distributing a drive torque to two output shafts. Bevel gear differentials, in particular, make it possible, with the aid of differential pinions, for the two output shafts to be turned relative to one another. Therefore, for example, different angular speeds can be compensated for during cornering by vehicles. The differential pinions are held in a differential cage with the aid of bolts.

Publication DE 10 2004 003 643 A1, which is the closest prior art, discloses a differential, in particular for a portal axle of a vehicle, with a differential cage that includes a first differential cage part and a second differential cage part which are bolted together, wherein the division of the differential cage into the differential cage parts takes place asymmetrically. Moreover, the differential includes a differential spider, wherein the differential spider is designed to include a cross fitting, four differential bolts, and four retaining pins which function as anti-torsion mechanisms.

SUMMARY OF THE INVENTION

Example aspects of the invention provide a differential device which ensures cost-effective production and a safe operating behavior.

According to example aspects of the invention, a differential device is provided, which is suitable and/or designed for a vehicle. In particular, the differential device is designed as a differential gear. Preferably, the differential device is arranged in an axle of a vehicle. The differential device can be designed, in particular, as a longitudinal differential gear which distributes a drive torque of the vehicle to two axles of the vehicle. It is particularly preferred, however, when the differential device is designed as an interwheel differential gear which distributes the drive torque to two wheels of a driven axle of the vehicle.

The differential device includes a differential spider. The differential spider includes a bolt body with four bolt sections. In particular, the differential spider has the function of distributing the drive torque to two side gears of the differential device. In particular, the bolt body is cross-shaped and includes four legs. Preferably, each leg is formed by a bolt section. It is particularly preferred when the bolt sections are arranged at right angles with respect to one another.

The differential device includes four bevel gears. The bevel gears have been put onto the bolt sections. In particular, the bevel gears are rotatably mounted on the bolt sections. Preferably, the bevel gears are designed as differential pinions. In particular, the bevel gears intermesh with at least one of the side gears, preferably with both side gears. In particular, the side gears are designed for accommodating a shaft, preferably a half-shaft. Preferably, the side gears form a part of the differential device.

The differential device includes a differential housing. In particular, the differential housing forms a differential cage. The differential housing preferably has two differential housing sections. In particular, a first differential housing section forms the differential cage and a second differential housing section forms a cover for closing the differential cage. Alternatively, the two differential housing sections are designed as two differential housing halves. In particular, the two differential housing sections are integrally joined to one another and/or are connected to one another in a force-locking and/or form-locking and/or friction-locking manner.

The differential spider is arranged in the differential housing. In particular, the bolt body has the function of supporting and/or securing the bevel gears in the differential housing. In particular, the differential spider is arranged in the first or in the second differential housing section. Alternatively, the differential spider is arranged between the two differential housing sections. The differential housing defines an axis of rotation. In particular, the side gears and/or the half-shafts rotate about the axis of rotation. In particular, the differential spider, preferably the bolt body, is fixed in the axial direction with respect to the axis of rotation by the differential housing, preferably by the first housing section and/or the second housing section.

Within the scope of the invention, it is provided that the bolt body includes a main differential bolt with two bolt sections and two differential bolts, each of which includes a bolt section. In particular, the differential housing includes at least one bolt receptacle for accommodating the main differential bolt and/or the two differential bolts. It is particularly preferred, however, when the differential housing has precisely four bolt receptacles, wherein each of the bolt sections is arranged in one of the bolt receptacles, preferably in a form-locking and/or friction-locking manner.

The main differential bolt includes a locating section, wherein the differential bolts are accommodated in the locating section. In particular, the main differential bolt defines a main axis via its longitudinal axis. In particular, due to the accommodation of at least one of the differential bolts in the locating section, the main differential bolt is fixed in the axial direction and/or in the circumferential direction with respect to the main axis and in the axial direction and/or in the radial direction with respect to the axis of rotation. The two differential bolts are accommodated in the locating section, in particular, so as to be diametrically opposed, so that the first and the second differential bolts each form a right angle with the main axis. In particular, a bevel gear is associated with each of the two differential bolts and two bevel gears are associated with the main differential bolt.

One example advantage of the invention is that the differential bolts are secured in a simple way, in particular, due to the simple design of the main differential bolt, wherein cost-effective manufacturing is simultaneously possible. One further advantage is that an additional securing of the main differential bolt, for example, with the aid of a retaining means, can be omitted due to the accommodation of at least one of the differential bolts in the locating section. Therefore, it can be sufficient to provide only the differential bolts with an additional securing. One further advantage is the simple and fast installation of the bolt body and the differential spider in the differential housing. Therefore, cost-effective production is achieved due to the differential device according to the invention.

In a preferred structural embodiment, the main differential bolt is designed as a continuous and/or one-piece bolt. In particular, the bolt sections of the main differential bolt are connected to one another as one piece and/or are produced as one piece from a common semi-finished product. In particular, the main differential bolt is designed as a cylindrical rod. Preferably, a bevel gear is arranged on each of the axial ends of the main differential bolt.

In particular, the locating section is designed as a central opening or recess. In particular, the opening is continuous. For example, the opening is designed as a bore hole or a breakthrough. In particular, the recess is not continuous. For example, the recess is designed as a groove or a notch or a blind hole. In particular, the differential bolts are designed in such a way that at least one axial end of the differential bolts can be accommodated in the locating section in a form-locking and/or force-locking and/or friction-locking manner. In particular, the differential bolt, via the at least one axial end, forms a contour partner with the locating section. In particular, the differential bolts include at least one tapered axial end or one conical axial end to be accommodated in the locating section.

In one possible structural implementation, at least one of the differential bolts is connected to the differential housing and/or to the main differential bolt and/or the differential bolts are connected to one another via an interference fit. The interference fit has the function, in particular, of securing the differential bolt against working its way out of the differential housing and/or turning.

In particular, a first axial end of the differential bolt is connected to the locating section and/or to the second differential bolt via the interference fit. Alternatively or, optionally, in addition, a second axial end of the differential bolt is connected to the differential housing via the interference fit. In particular, the differential bolts are connected to the differential housing and/or to the main differential bolt in a force-locking and/or friction-locking manner via the interference fit.

In one further or optionally additional structural implementation, at least one of the differential bolts is connected to the differential housing and/or to the main differential bolt and/or the differential bolts are connected to one another via at least one securing means. The securing means has the function, in particular, of securing the differential bolt against working its way out of the differential housing and/or turning. In particular, the securing means is designed as a retaining pin or a tapered pin or a cylindrical pin or a grooved pin.

In particular, the first axial end of the differential bolt is connected to the locating section and/or to the second differential bolt via the securing means. Alternatively or, optionally, in addition, the second axial end of the differential bolt is connected to the differential housing via the securing means. In particular, the differential bolts are connected to the differential housing and/or to the main differential bolt and/or to one another in a force-locking and/or form-locking manner via the securing means.

In one further or optionally additional structural implementation, at least one of the differential bolts is connected to the differential housing and/or to the main differential bolt and/or the differential bolts are connected to one another via at least one bolting means. The bolting means has the function, in particular, of securing the differential bolt against working its way out of the differential housing and/or turning. In particular, the bolting means is a bolt, in particular including a metric thread. Preferably, the bolting means is designed as a cylindrical bolt, for example, a cylindrical fitted bolt, or as a threaded rod, or a hexagon bolt, or a countersinking screw.

In particular, the first axial end of the differential bolt is connected to the locating section and/or to the second differential bolt via the bolting means. Alternatively or, optionally, in addition, the second axial end of the differential bolt is connected to the differential housing via the bolting means. In particular, the differential bolts are connected to the differential housing and/or to the main differential bolt and/or to one another in a force-locking and/or form-locking manner via the bolting means.

In one further or optionally additional structural implementation, at least one of the differential bolts is connected to the differential housing and/or to the main differential bolt and/or the differential bolts are connected to one another via at least one plug connection. The plug connection has the function, in particular, of securing the differential bolt against working its way out of the differential housing and/or turning.

In particular, the first axial end of the differential bolt is connected to the locating section and/or to the second differential bolt in a form-locking and/or friction-locking manner via the plug connection. Alternatively or, optionally, in addition, the second axial end of the differential bolt is connected to the differential housing via the plug connection. In particular, the differential bolts are connected to the differential housing and/or to the main differential bolt and/or to one another in a friction-locking and/or form-locking manner via the plug connection.

In one structural implementation, the differential housing includes at least one fastening section on a radial outer side with respect to the main axis. In particular, the differential housing includes precisely two fastening sections, wherein the two fastening sections are uniformly spaced apart in the circumferential direction with respect to the axis of rotation and/or are arranged opposite one another.

Alternatively or, optionally, in addition, the two differential bolts each include a fixing section on their axial ends. In particular, the fixing section is arranged on the first and/or on the second axial end of the differential bolt. Alternatively or, optionally, in addition, the main differential bolt includes a further fixing section in the area of the locating section. In particular, the further fixing section extends in parallel to or on the axis of rotation.

In one structural embodiment, the fastening section is designed as a first opening extending in parallel to the axis of rotation and the fixing section is designed as a second opening extending in parallel to the axis of rotation. In particular, the first opening and/or the second opening are/is designed as a bore hole and/or a breakthrough. A securing means is guided through the first and the second openings. In particular, the securing means is the retaining pin. In particular, the first and the second openings are aligned, so that, preferably, the retaining pin can be slid through the two openings unobstructed.

Alternatively or, optionally, in addition, the differential bolt is connected to the main differential bolt and/or to the differential housing via the interference fit. In particular, the securing of the differential bolt in the radial direction with respect to the axis of rotation takes place with the aid of the retaining pin and/or the interference fit. In particular, the securing of the differential bolt against turning takes place with the aid of the interference fit with the differential housing.

In one further structural embodiment, one further securing means is guided through the first and the second openings and/or through the securing means. In particular, the further securing means is a further retaining pin having smaller dimensions than the retaining pin. Preferably, the further retaining pin can be and/or has been slid into the retaining pin in a form-locking and/or friction-locking and/or force-locking manner. In particular, the securing of the differential bolt in the radial direction with respect to the axis of rotation and/or against turning takes place with the aid of the two securing means. In particular, the differential bolt and the differential housing form a clearance fit.

In one further structural embodiment, the fixing section is designed as a passage opening along a longitudinal axis of the differential bolts. In particular, the passage opening is designed as a counterbore. In particular, the counterbore includes a conical or a cylindrical depression.

The bolting means is guided through the passage opening and connects the two differential bolts to one another along the longitudinal axis. In particular, the bolting means is a bolt or a threaded rod. Preferably, the bolting means is slid through the passage opening along the longitudinal axis and, particularly preferably, a nut can be and/or is screwed on at least one axial end.

In particular, the two differential bolts are connected to one another in a form-locking and/or friction-locking manner with the aid of the bolting means. In particular, the securing of the differential bolt in the radial direction with respect to the axis of rotation takes place with the aid of the bolting means. In particular, the securing of the differential bolt against turning takes place with the aid of the interference fit with the differential housing.

In one further structural embodiment, the fixing section is designed as a recess on one of the axial ends of the differential bolts. In particular, the recess is formed with the aid of a manufacturing method, preferably via separation and/or shaping and/or primary shaping. In particular, at least one of the differential bolts, in an installed condition, includes the recess, preferably a milled recess, on its radial outer side with respect to the axis of rotation.

The fastening section is designed as the first opening, wherein the securing means is guided through the first opening and the milled recess forms a stop for the securing means in the axial direction with respect to the axis of rotation. In particular, the securing means is, for example, a retaining pin or a tapered pin or a cylindrical pin. In particular, the recess extends in the radial direction so far that the securing means has been and/or can be driven across the surface area of the recess. In particular, the securing means forms a form-locking connection with the differential bolt, so that the differential bolt is secured against working its way out of the differential housing.

In particular, the securing of the differential bolt in the radial direction with respect to the axis of rotation takes place with the aid of the securing means and/or the interference fit. In particular, the securing of the differential bolt against turning takes place with the aid of the interference fit with the differential housing.

In one further structural embodiment, the fastening section is designed as the first opening and the fixing section is designed as the second opening, wherein a further bolting means is guided through the first and the second openings. In particular, the further bolting means is a cylindrical fitted bolt or a cheese head screw, etc. In particular, the further bolting means has the function of securing the differential bolts and/or connecting the two housing halves to one another in a force-locking and/or form-locking manner.

The fastening section includes an internal thread, so that the further bolting means is engaged with the internal thread. In particular, the securing of the differential bolt in the radial direction with respect to the axis of rotation and/or against turning takes place with the aid of the cylindrical fitted bolt.

In one further structural embodiment, the two differential bolts each include at least one ridge section. In particular, the ridge sections have an angular cross-section or a round cross-section. For example, the ridge sections have a rectangular cross-section or an L-shaped cross-section, or a semicircular cross-section. In particular, the two ridge sections form a contour partner with respect to one another.

The two ridge sections are accommodated in the locating section. In particular, the locating section has a round cross-section or an angular cross-section, wherein the two ridge sections are accommodated in the locating section in a form-locking manner. Preferably, the two ridge sections together form a cross-section which is geometrically similar to the locating section. It is particularly preferred when the two ridge sections are accommodated in the locating section true to size.

The securing means connects the locating section to the two ridge sections via the further fixing section. In particular, the further fixing section is a breakthrough or a bore hole. Preferably, the further fixing section extends through the main differential bolt and/or the two ridge sections in the area of the locating section. In particular, the fixing section extends along or in parallel to the axis of rotation.

The two differential bolts each include at least one contact section. In particular, the contact section is a flattening in the cylindrical outer surface of the differential bolts. Preferably, at least one differential bolt, particularly preferably both differential bolts, includes/include a second contact section, so that, in particular, a cylindrical flattening is formed on both sides. In particular, the flattening extends in the radial direction across at least fifty percent (50%), preferably across at least twenty-five percent (25%), particularly preferably across five percent (5%) of the longitudinal extension of the differential bolt. Alternatively or, optionally, in addition, the flattening extends across less than ninety percent (90%), preferably less than forty percent (40%), particularly preferably less than ten percent (10%) of the longitudinal extension of the differential bolt. Alternatively, the flattening extends across the entire length of the differential bolt.

The contact section and the locating section form a positive engagement. In particular, the main differential bolt rests, in particular via its locating section, against the contact section in the axial direction with respect to the main axis. In particular, the differential bolt is arranged, via the contact section, in the locating section true to size. In particular, the contact section and/or the ridge section form/forms the plug connection. Preferably, the contact section and/or the ridge section form/forms a contour partner with respect to one another and/or with respect to the locating section.

In particular, the securing of the differential bolt in the radial direction with respect to the axis of rotation takes place with the aid of the securing means. In particular, the differential bolt is secured against turning with the aid of the contact section.

One further object of the invention is a vehicle including the differential device of the type described above.

BRIEF DESCRIPTION OF THE DRAWINGS

Further features, advantages, and effects of the invention result from the following description of preferred exemplary embodiments of the invention. Wherein:

FIG. 17 shows a detailed view of a locating section of a main differential bolt of the sixth alternative embodiment of the differential spider.

Mutually corresponding or identical parts are provided with the same reference characters in the figures.

DETAILED DESCRIPTION

Figure 1:
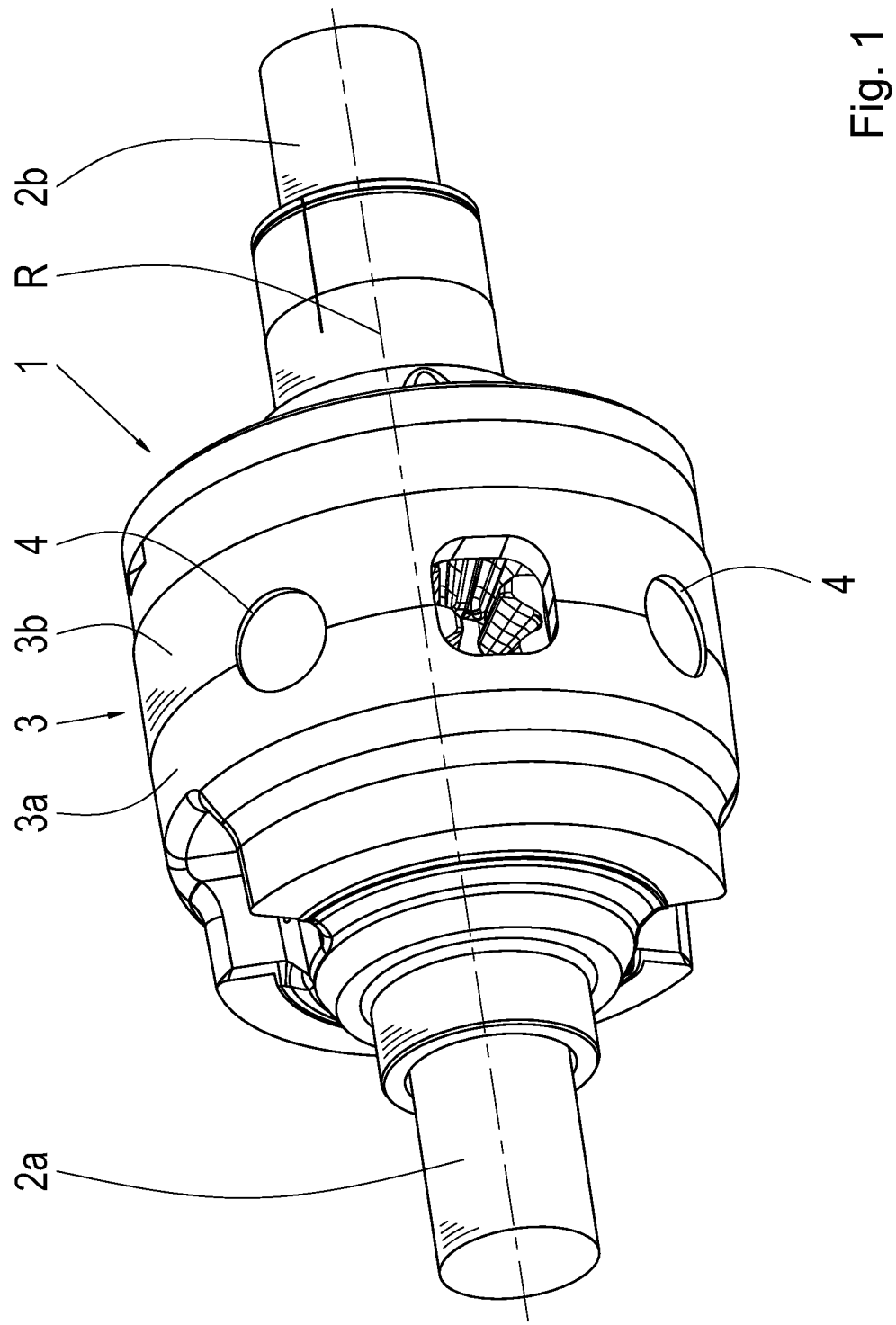
FIG. 1 shows a three-dimensional representation of a differential device as an exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a three-dimensional representation of a differential device 1. The differential device 1 is designed as an interwheel differential including a first half-shaft 2a and a second half-shaft 2b. The half-shafts 2a, 2b are shown in a highly simplified diagrammatic manner. For example, the two half-shafts 2a, 2b form an axle of a vehicle, wherein the two half-shafts 2a, 2b are each connected to a vehicle wheel in a driving manner.

The differential device 1 includes a differential housing 3, wherein the differential housing 3 forms a differential cage. The differential housing 3 includes a first housing section 3a and a second housing section 3b. The differential housing 3 defines an axis of rotation R, about which the two half-shafts 2a, 2b rotate. The differential housing 3 includes four bolt receptacles 4 uniformly spaced apart from one another in the circumferential direction with respect to the axis of rotation R; only two bolt receptacles 4 are shown in the representation shown.

Figure 2:
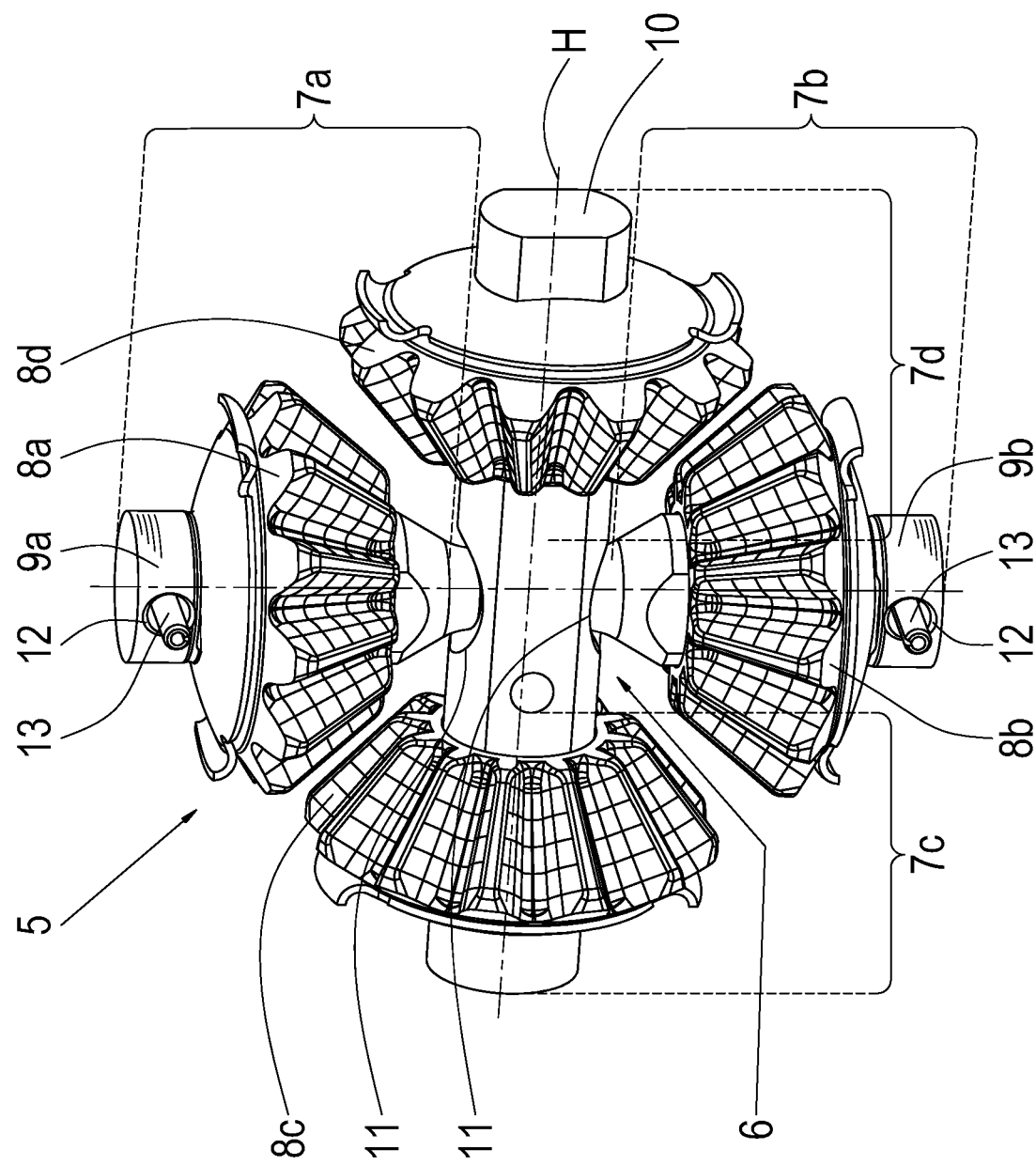
FIG. 2 shows a three-dimensional representation of a differential spider as an integral part of the differential device.

FIG. 2 shows a three-dimensional representation of a differential spider 5. The differential spider 5 includes a bolt body 6 including a first bolt section 7a, a second bolt section 7b, a third bolt section 7c, and a fourth bolt section 7d. The bolt sections 7a, 7b, 7c, 7d together form a cross including legs, for example, of equal length. In an installed condition of the differential device 1, the bolt sections 7a, 7b, 7c, 7d are each accommodated in one of the four bolt receptacles 4. A first bevel gear 8a has been put onto the first bolt section 7a, a second bevel gear 8b has been put onto the second bolt section 7b, a third bevel gear 8c has been put onto the third bolt section 7c, and a fourth bevel gear 8d has been put onto the fourth bolt section 7d. The bevel gears 8a, 8b, 8c, 8d are rotatably mounted on the bolt sections 7a, 7b, 7c, 7d.

The bolt body 6 includes a first differential bolt 9a and a second differential bolt 9b, and a main differential bolt 10. The first differential bolt 9a includes the first bolt section 7a and the second differential bolt 9b includes the second bolt section 7b. The main differential bolt 10 includes the third bolt section 7c and the fourth bolt section 7d, wherein the two bolt sections 7c, 7d are connected to one another as one piece. The main differential bolt 10 defines, via its longitudinal axis, a main axis H. The main differential bolt 10 is designed as a continuous, one-piece bolt and includes a locating section 11 for accommodating the first differential bolt 9a and the second differential bolt 9b. The locating section 11 is a central opening, for example, a bore hole in the main differential bolt 10 extending transversely to the main axis H. The two differential bolts 9a, 9b are two individual, short bolts and, for example, have the same length. The two differential bolts 9a, 9b are accommodated in the locating section 11 so as to be diametrically opposed, and so the two differential bolts 9a, 9b form a right angle with respect to the main axis H and the main differential bolt 10.

The two differential bolts 9a, 9b each include a fixing section 12 for accommodating a retaining means 13, for example, a retaining pin. The fixing section 12 is, for example, a bore hole, wherein the fixing section 12 is arranged on an outer end of the differential bolts 9a, 9b. The fixing section 12 extends through the cylindrical outer surface of the differential bolts 9a, 9b. The retaining means 13 has been and/or can be slid into the fixing section 12.

Figure 3:
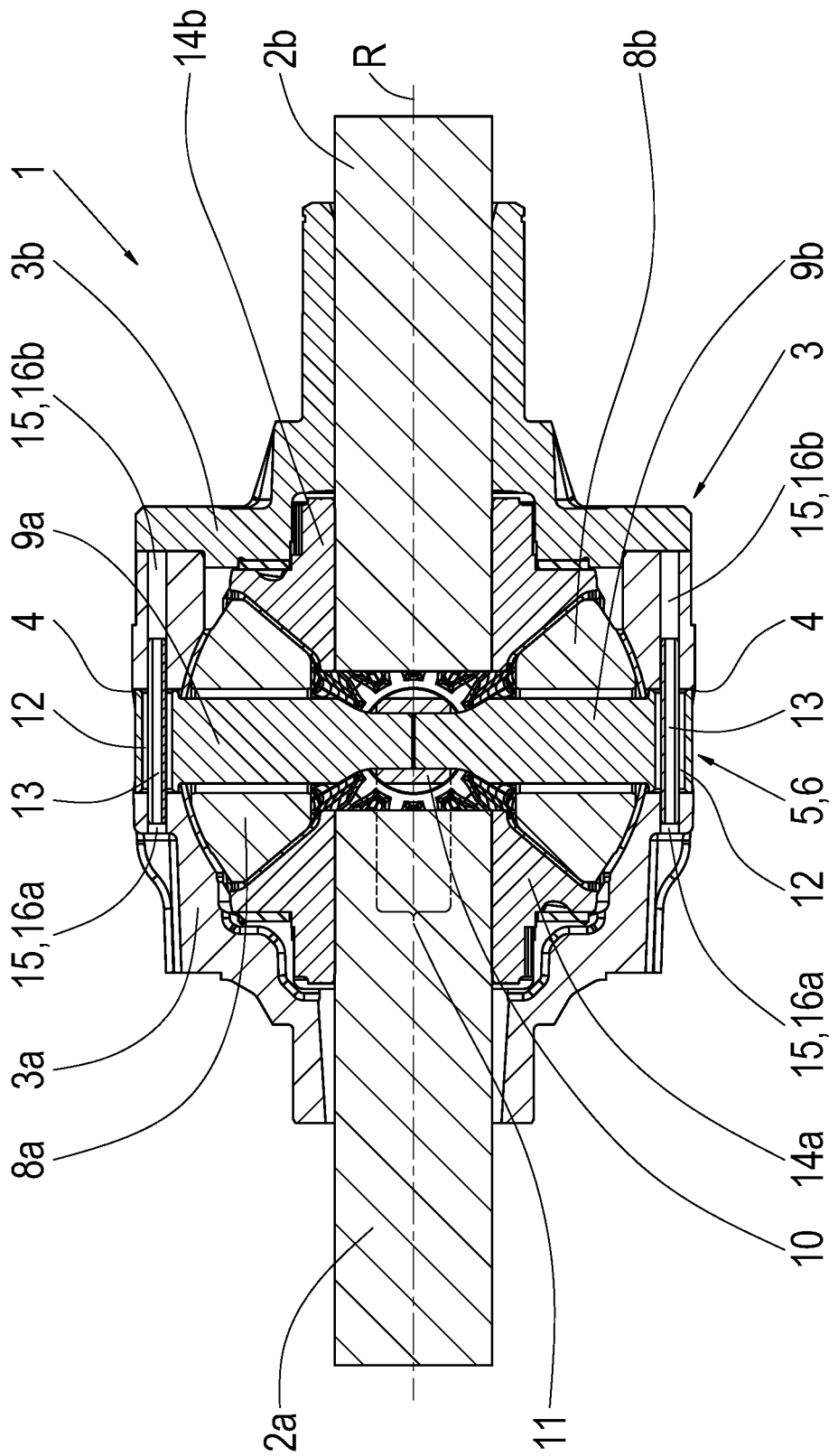
FIG. 3 shows a sectioning of the differential device including the differential spider.

FIG. 3 shows a longitudinal section along the axis of rotation R through the differential device 1 of FIG. 2. A first side gear 14a and a second side gear 14b are arranged in the differential housing 3. The first side gear 14a is designed for accommodating the first half-shaft 2a and the second side gear 14b is designed for accommodating the second half-shaft 2b. The two half-shafts 2a, 2b are rotationally fixed to the two side gears 14a, 14b. The two side gears 14a, 14b and the two half-shafts 2a, 2b rotate, in an operating condition, about the axis of rotation R. The two side gears 14a, 14b intermesh with the four bevel gears 8a, 8b, 8c, 8d of the differential spider 5.

The differential spider 5 and the bolt body 6 are arranged in the differential housing 3, in particular in the first housing section 3a. The first housing section 3a, in particular the bolt receptacles 4, fixes/fix the differential spider 5 and the bolt body 6 in the axial direction and in the circumferential direction with respect to the axis of rotation R. The first differential bolt 9a and the second differential bolt 9b are each accommodated in one of the bolt receptacles 4.

The differential housing 3 includes a fastening section 15 on it radial outer side with respect to the axis of rotation R. In the exemplary embodiment shown, the fastening section 15 includes a bore hole which extends in parallel to the axis of rotation R. The fastening section 15 includes a first fastening subsection 16a and a second fastening subsection 16b. The first fastening subsection 16a and the second fastening subsection 16b are arranged on the radial outer sides of the first housing section 3a. The fastening section 15 is arranged in the area of the bolt receptacles 4 which accommodate the two differential bolts 9a, 9b.

The fixing section 12 and the fastening section 15 are aligned in an installed condition of the differential spider 5, so that the retaining means 13 is slid and/or can be slid, in the axial direction with respect to the axis of rotation R, into the first fastening subsection 16a, into the fixing section 12, and into the second fastening subsection 16b. The two differential bolts 9a, 9b are therefore secured in the radial direction with respect to the axis of rotation R. The differential bolts 9a, 9b form an interference fit with the locating section 11 and/or with the bolt receptacle 4, so that the two differential bolts 9a, 9b are secured against turning in the differential housing 3.

Figure 4:
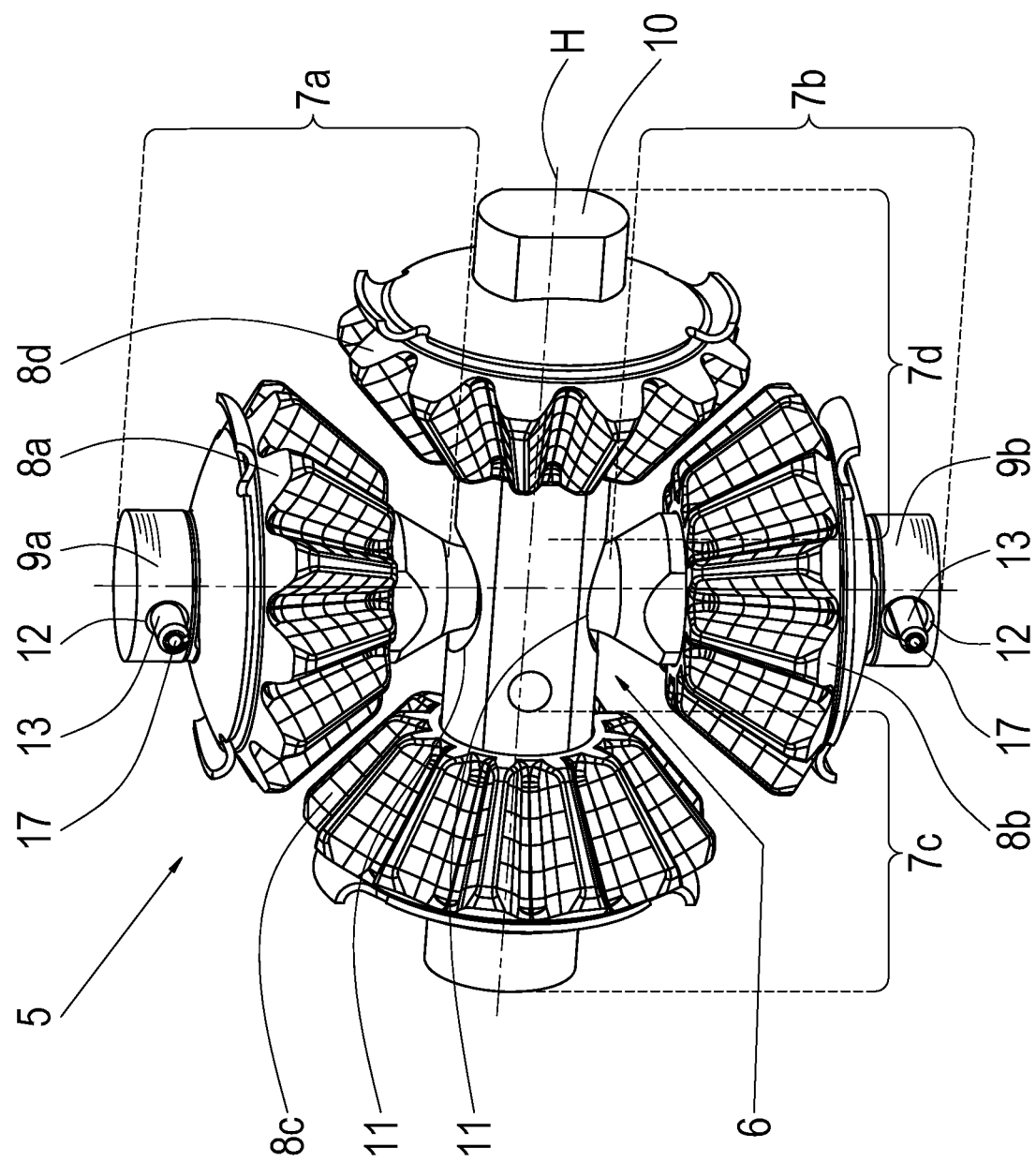
FIG. 4 shows the differential spider in the same representation as in FIG. 2, including a first alternative embodiment of the differential spider.
Figure 5:
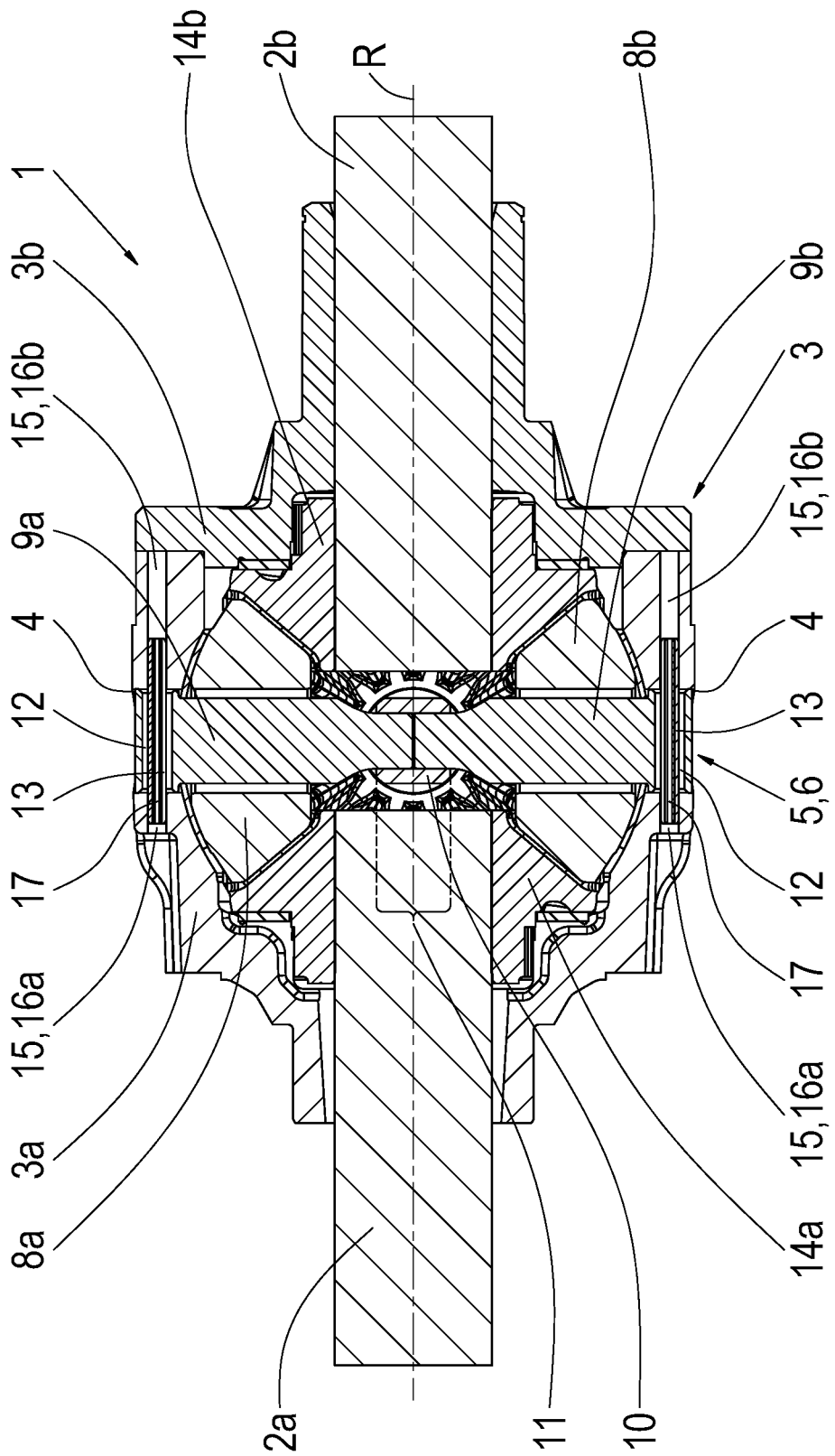
FIG. 5 shows the differential device in the same representation as in FIG. 3, including the first alternative embodiment of the differential spider.

FIGS. 4 and 5 show, in the same representation as in FIGS. 2 and 3, the differential spider 5 in a removed condition and the differential device 1 including the differential spider 5 in an installed condition, respectively. The two differential bolts 9a, 9b are additionally secured by a further retaining means 17, for example, a further retaining pin having a smaller diameter. The further retaining means 17 has been slid into the retaining means 13. The two differential bolts 9a, 9b are therefore secured in the radial direction with respect to the axis of rotation R. Due to the further retaining means 17, the two differential bolts 9a, 9b are also secured against turning in the differential housing 3. For example, the two differential bolts 9a, 9b form a clearance fit with the bolt receptacle 4, and/or form an interference fit or a clearance fit with the locating section 11.

Figure 6:
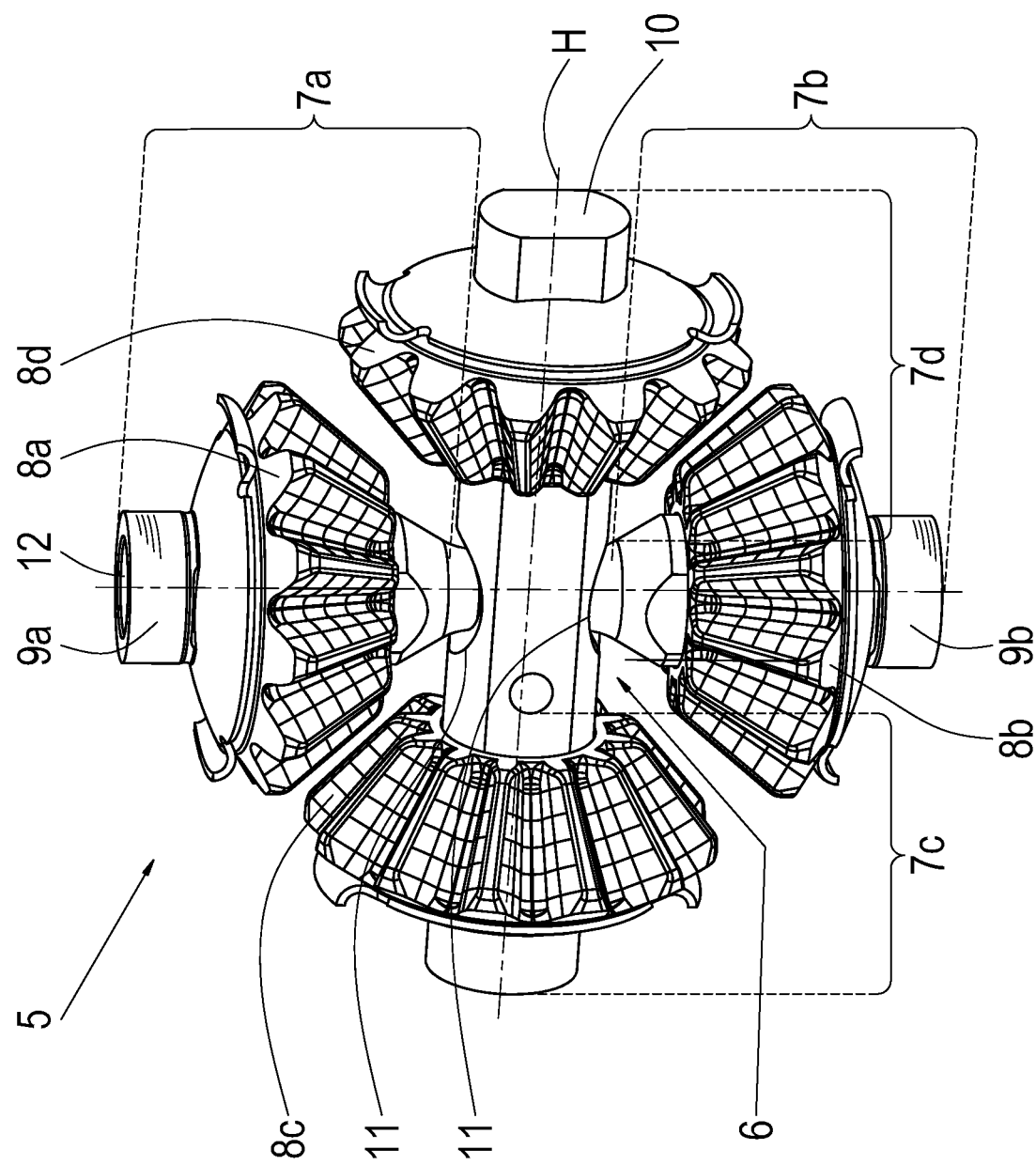
FIG. 6 shows the differential spider in the same representation as in FIG. 2, including a second alternative embodiment of the differential spider.
Figure 7:
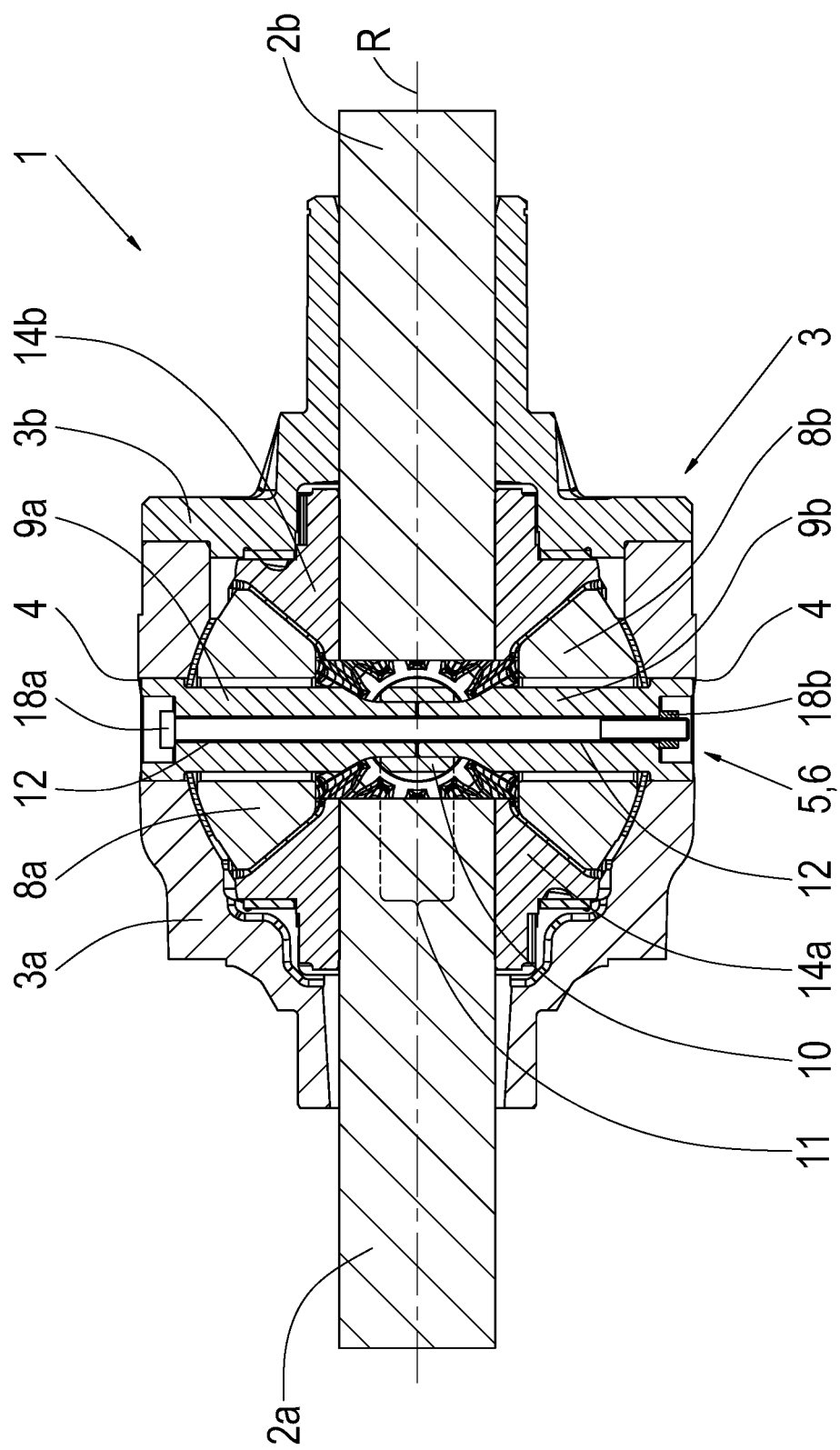
FIG. 7 shows the differential device in the same representation as in FIG. 3, including the second alternative embodiment of the differential spider.

FIGS. 6 and 7 show, in the same representation as in FIGS. 2 and 3, the differential spider 5 in a removed condition and the differential device 1 including the differential spider 5 in an installed condition, respectively. In the embodiment shown in FIGS. 6 and 7, the fixing section 12 is a through hole which extends through the differential bolts 9a, b in the longitudinal direction. The two differential bolts 9a, 9b are connected to one another with the aid of a bolting means 18a and a nut 18b. The bolting means 18a, for example, a threaded rod or a cheese head screw, has been and/or can be slid into the fixing section 12 and is provided with the nut 18b on at least one axial end.

Thereafter, a force is applied to the two differential bolts 9a, 9b in the radial direction with respect to the axis of rotation R, for example, by tightening the nut 18a and/or the nut 18b. The two differential bolts 9a, 9b form an interference fit with the locating section 11, so that the differential bolts 9a, 9b are secured against turning. The two differential bolts 9a, 9b are secured in the radial direction with respect to the axis of rotation R by the bolting means 18a and the nut 18b. For example, the two differential bolts 9a, 9b form a clearance fit with the bolt receptacle 4.

Figure 8:
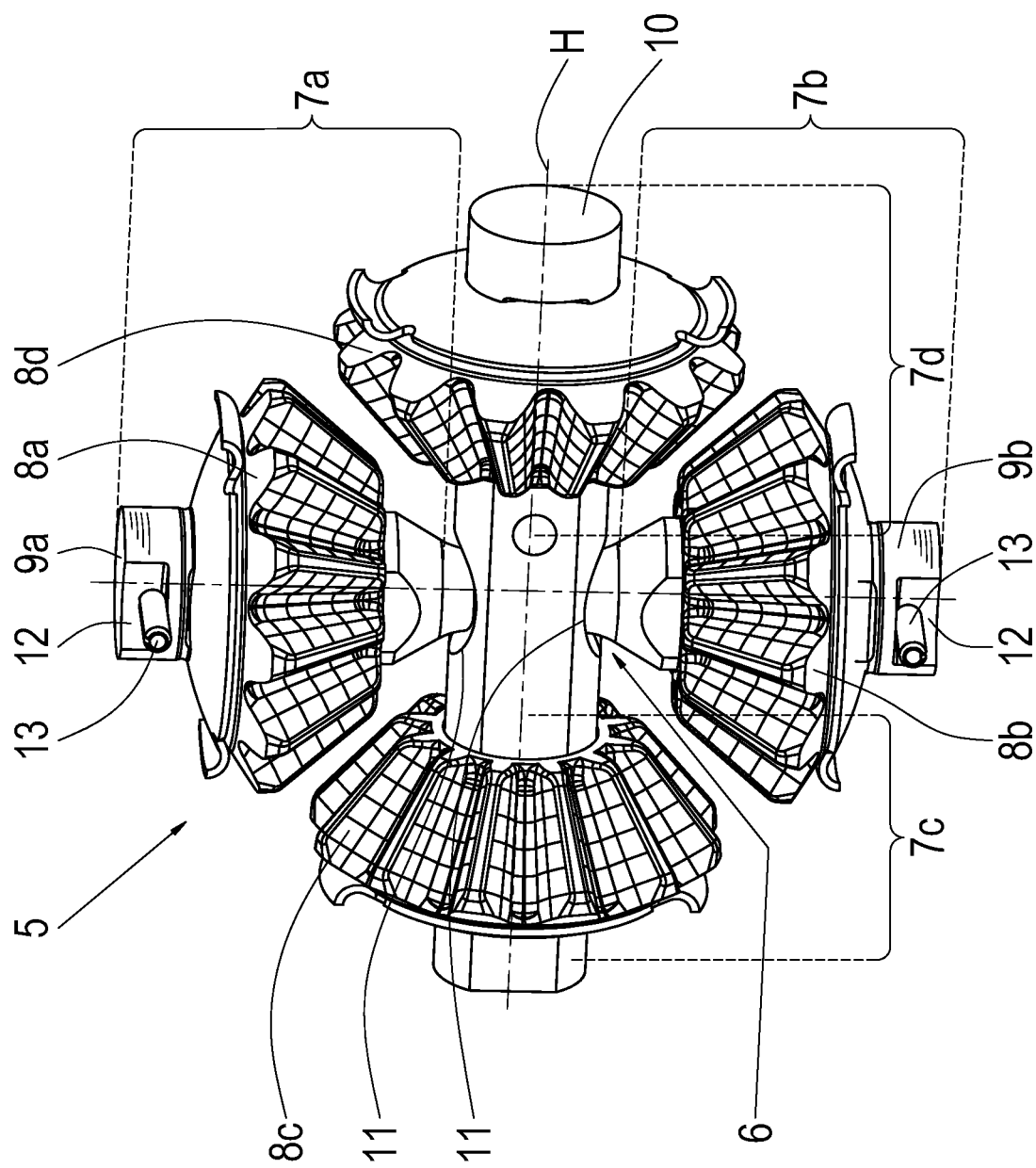
FIG. 8 shows the differential spider in the same representation as in FIG. 2, including a third alternative embodiment of the differential spider.
Figure 9:
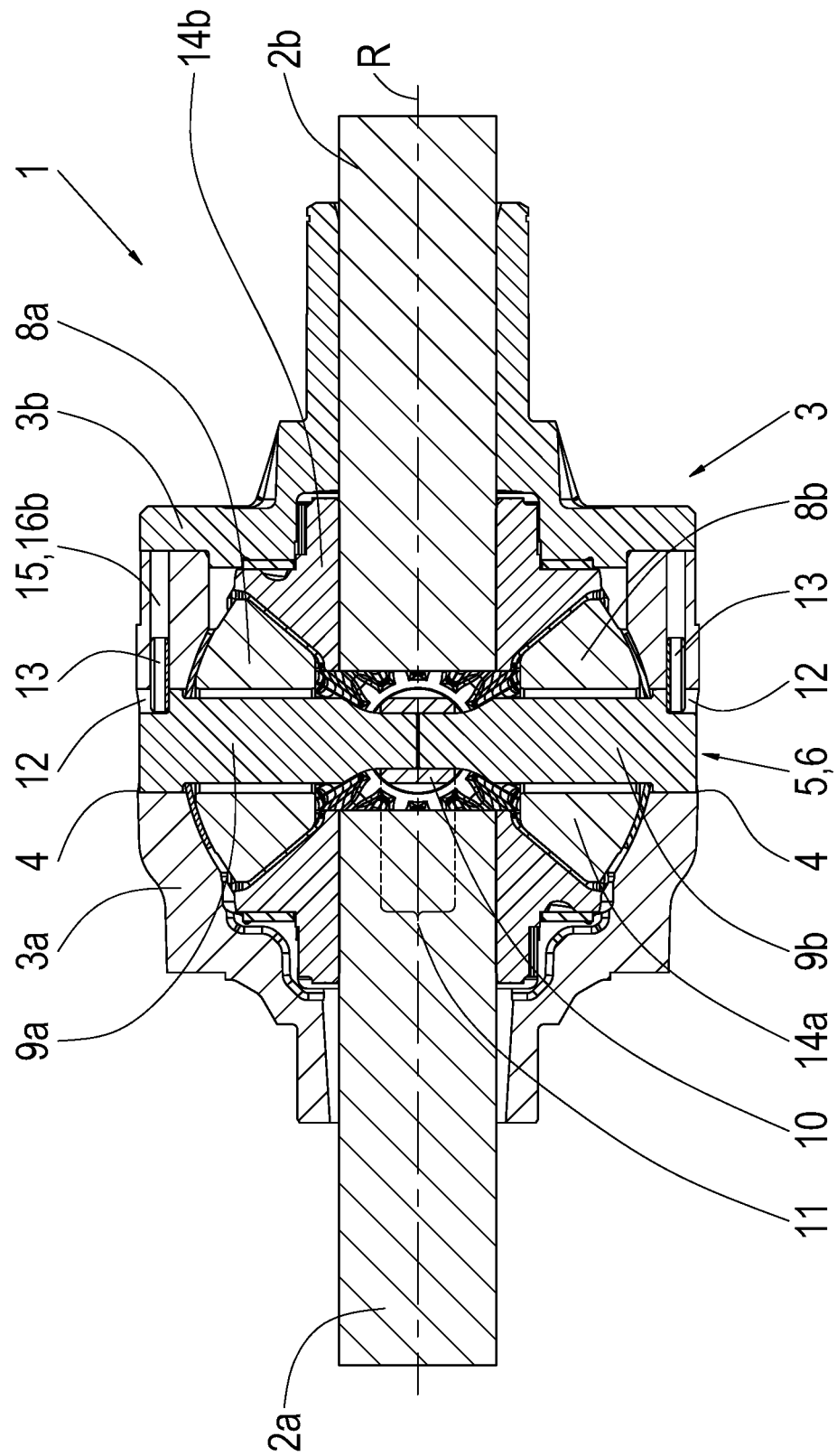
FIG. 9 shows the differential device in the same representation as in FIG. 3, including the third alternative embodiment of the differential spider.

FIGS. 8 and 9 show, in the same representation as in FIGS. 2 and 3, the differential spider 5 in a removed condition and the differential device 1 including the differential spider 5 in an installed condition, respectively. The fixing section 12 is formed by a recess on the top side of the differential bolts 9a, 9b. For example, the recess is a milled recess. The fastening section 15 includes only the second fastening subsection 16b. The fixing section 12 extends radially in the direction of the axis of rotation R only to the extent that the retaining means 13 forms a positive engagement with the fixing section 12, in particular with a surface area of the fixing section 12, in the radial direction with respect to the axis of rotation R. For example, the retaining means 13 is driven in the axial direction with respect to the axis of rotation R in the direction of the fixing section 12. The fixing section 12 extends only partially in the axial direction with respect to the axis of rotation R. Therefore, the fixing section 12 forms an axial limit for the retaining means 13.

The two differential bolts 9a, 9b are secured by the retaining means 13 in the radial direction with respect to the axis of rotation R. The differential bolts 9a, 9b form an interference fit with the locating section 11 and/or with the bolt receptacle 4, so that the two differential bolts 9a, 9b are secured against turning in the differential housing 3.

Figure 10:
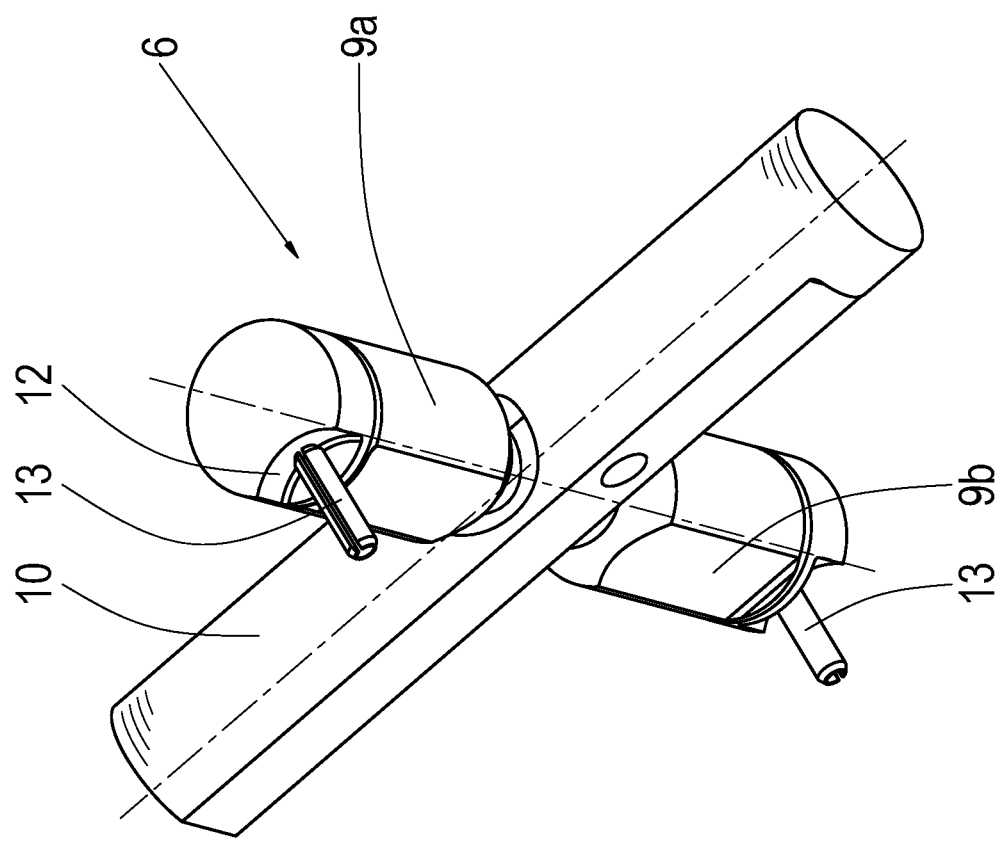
FIG. 10 shows a detailed view of a bolt body of the third alternative embodiment of the differential spider.

FIG. 10 shows a three-dimensional top view of a detailed view of the bolt body 6 including the main differential bolt 10 and the two differential bolts 9a, 9b of the embodiment described in FIGS. 8 and 9. The fixing section 12 extends, for example, across at least ten percent (10%) of the radial surface of the two differential bolts 9a, 9b. The fixing section 12 is a round subsection. Alternatively, the fixing section 12 is formed, for example, by a groove.

Figure 11:
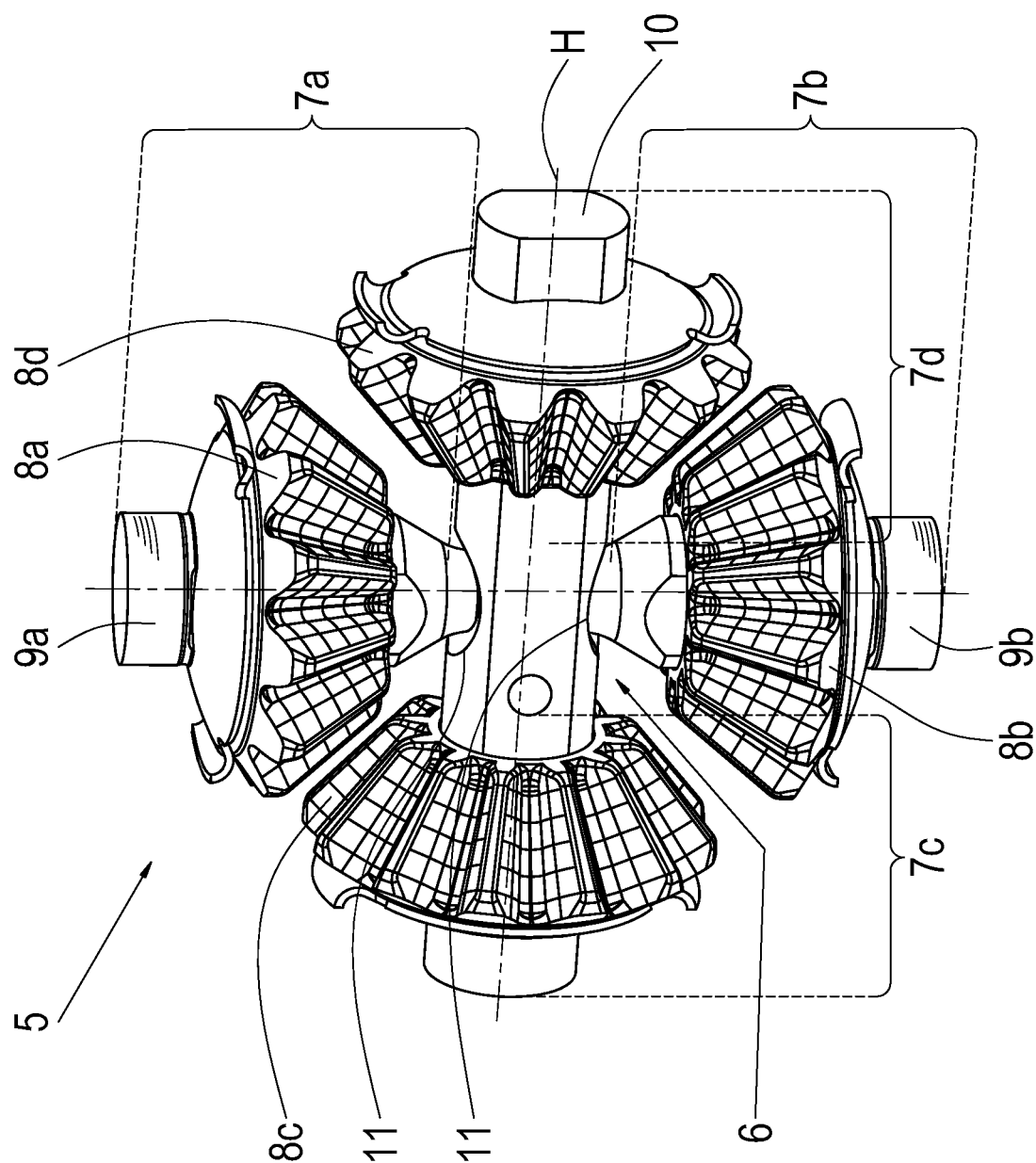
FIG. 11 shows the differential spider in the same representation as in FIG. 2, including a fourth alternative embodiment of the differential spider.
Figure 12:
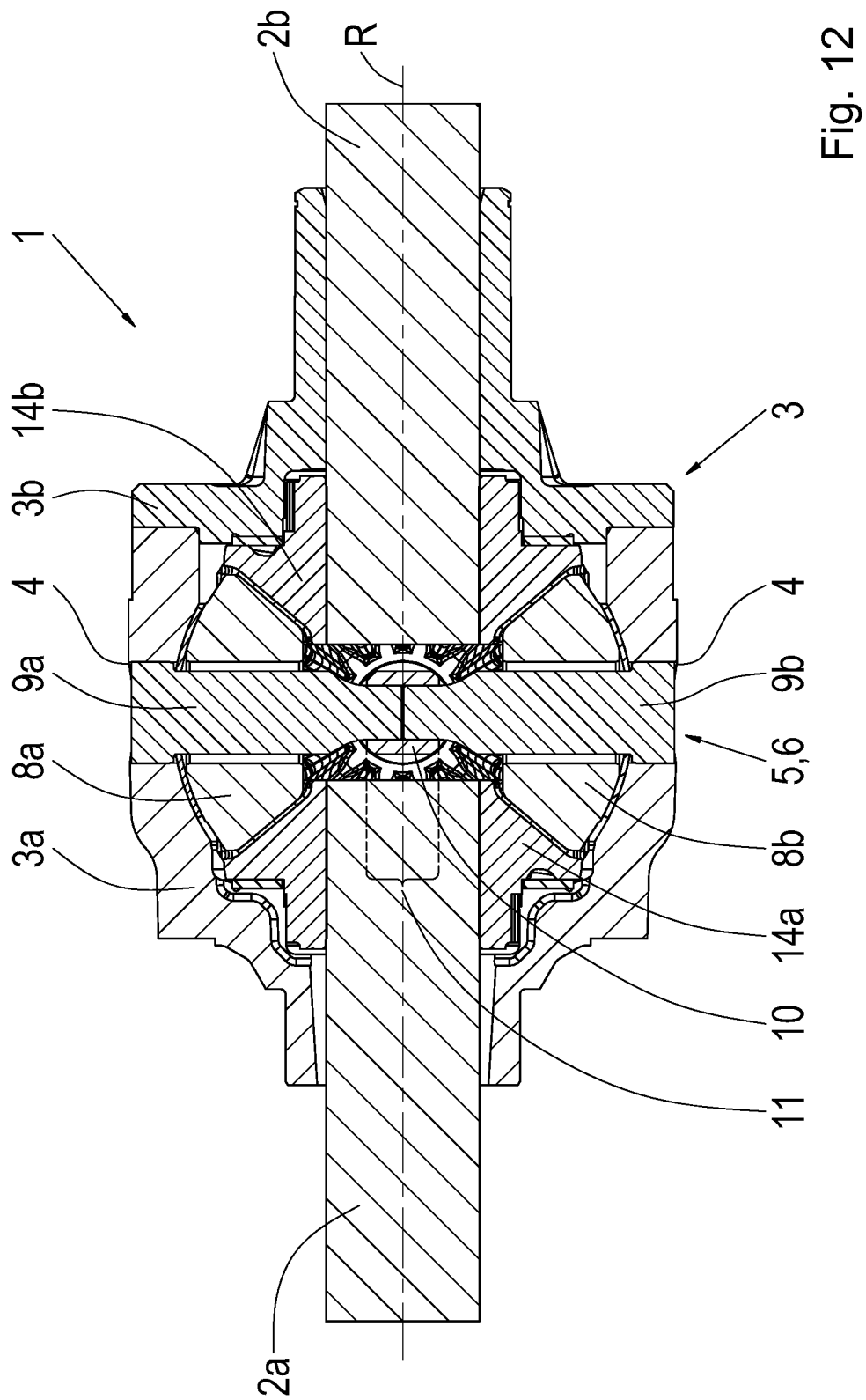
FIG. 12 shows the differential device in the same representation as in FIG. 3, including the fourth alternative embodiment of the differential spider.

FIGS. 11 and 12 show, in the same representation as in FIGS. 2 and 3, the differential spider 5 in a removed condition and the differential device 1 including the differential spider 5 in an installed condition, respectively. In the represented embodiment, the fixing section 12 and the fastening section 15 are not present. The securing of the two differential bolts 9a, 9b in the radial direction with respect to the main axis and/or the securing against turning take/takes place with the aid of the interference fit of the differential bolts 9a, 9b with the bolt receptacle 4 and/or with the locating section 11.

Figure 13:
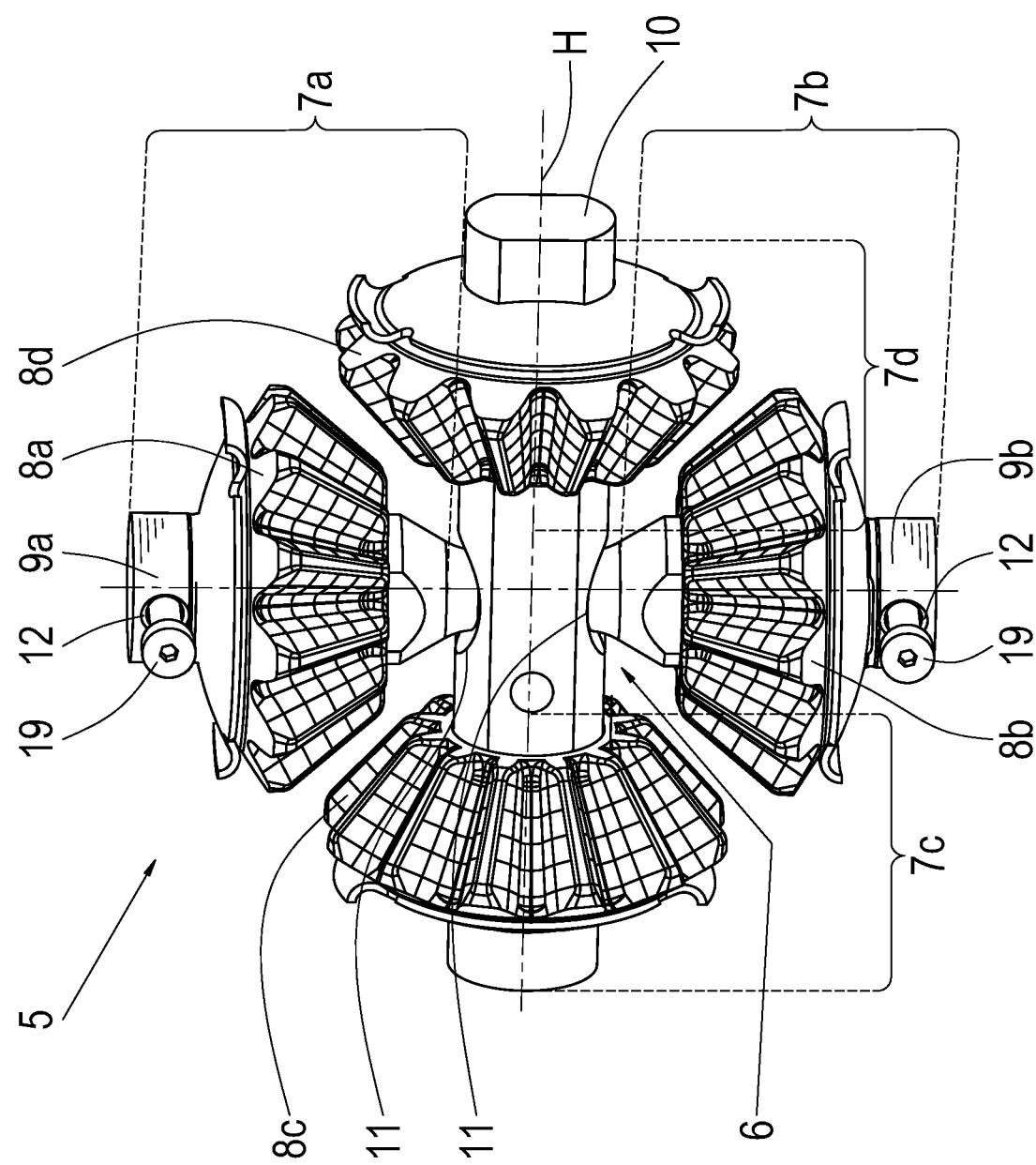
FIG. 13 shows the differential spider in the same representation as in FIG. 2, including a fifth alternative embodiment of the differential spider.
Figure 14:
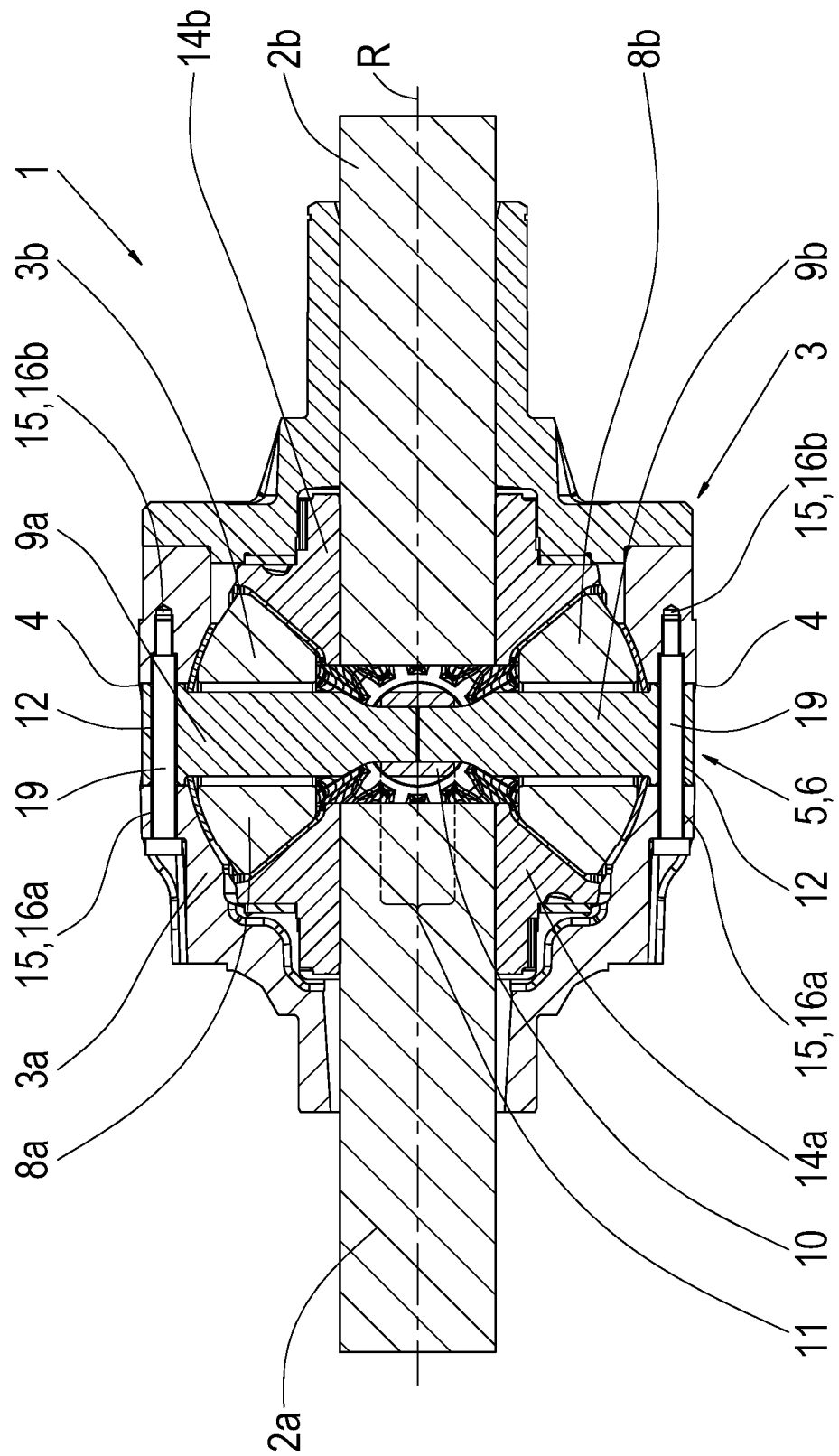
FIG. 14 shows the differential device in the same representation as in FIG. 3, including the fifth alternative embodiment of the differential spider.

FIGS. 13 and 14 show, in the same representation as in FIGS. 2 and 3, the differential spider 5 in a removed condition and the differential device 1 including the differential spider 5 in an installed condition, respectively. The fastening section 15 is arranged in the way described above with reference to FIG. 3 and is designed as a bore hole, wherein the first fastening subsection 16a and/or the second fastening subsection 16b include/includes an internal thread. The differential device 1 includes a further bolting means 19, for example, a cylindrical fitted bolt. The further bolting means 19 has been screwed, in the axial direction with respect to the axis of rotation R, into the first fastening subsection 16a and/or into the fixing section 12 and/or into the second fastening subsection 16b. The two differential bolts 9a, 9b are therefore secured in the radial direction with respect to the axis of rotation R and/or against turning.

Figure 15:
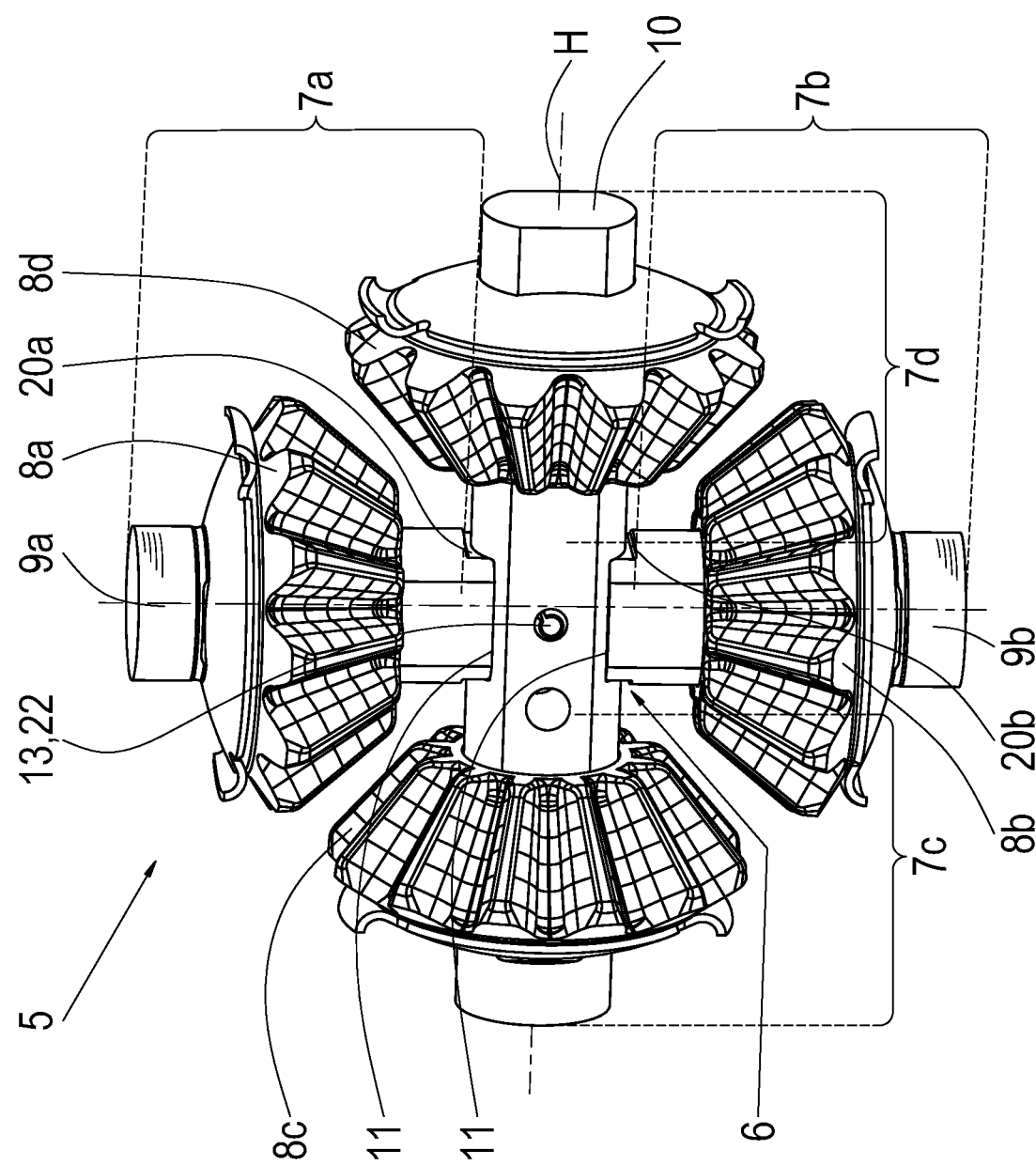
FIG. 15 shows the differential spider in the same representation as in FIG. 2, including a sixth alternative embodiment of the differential spider.
Figure 16:
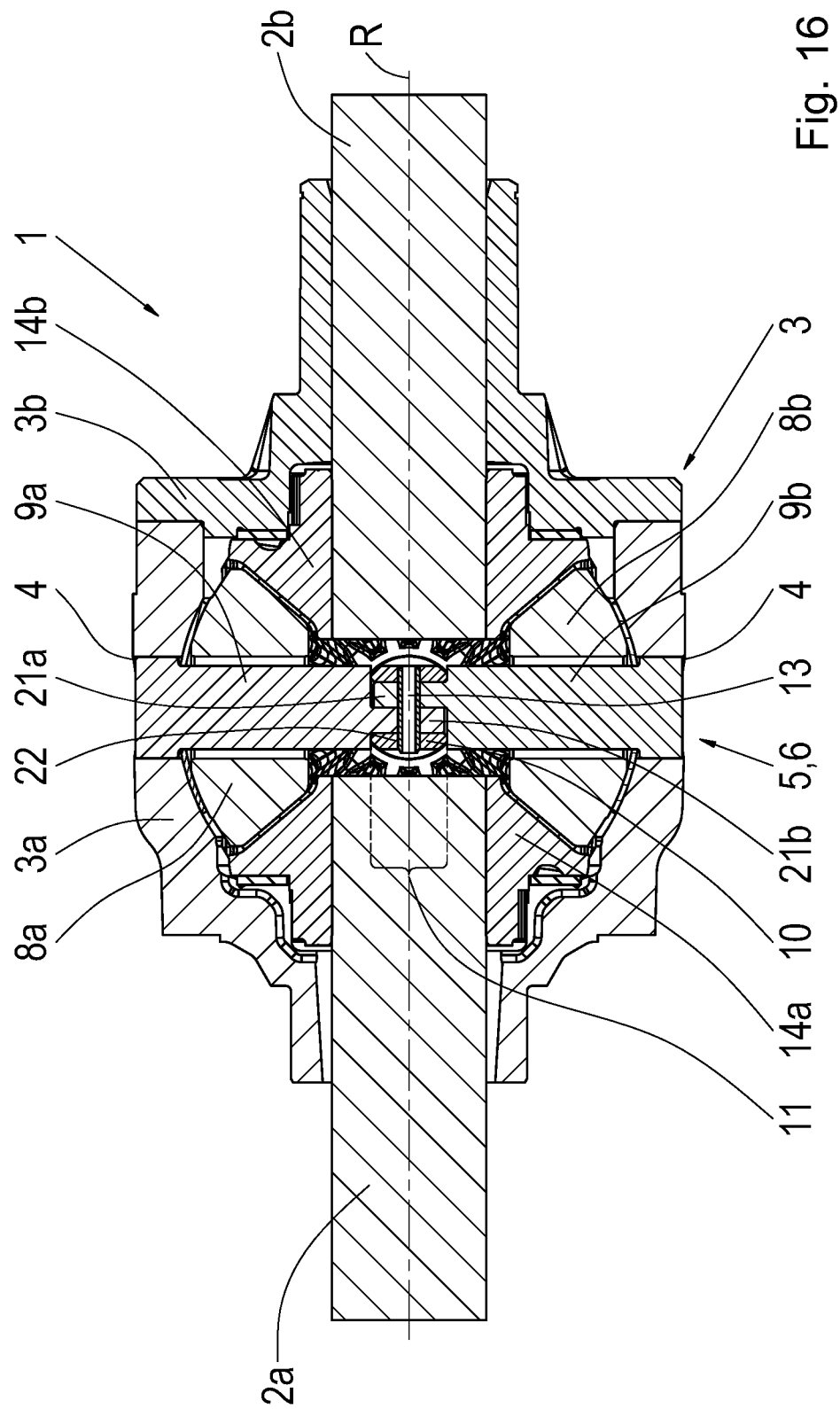
FIG. 16 shows the differential device in the same representation as in FIG. 3, including the sixth alternative embodiment of the differential spider.

FIGS. 15 and 16 show, in the same representation as in FIGS. 2 and 3, the differential spider 5 in a removed condition and the differential device 1 including the differential spider 5 in an installed condition, respectively. The two differential bolts 9a, 9b each include a contact section 20a, 20b, respectively, as shown in FIG. 15. The first contact section 20a and the second contact section 20b are designed as a cylindrical flattening which extends in the radial direction with respect to the main axis H only in the area of the locating section 11 and of the main differential bolt 10.

The two differential bolts 9a, 9b each include a ridge section 21a, 21b, respectively, as shown in FIG. 16. The ridge sections 21a, 21b have, for example, a rectangular shape or a semicircular shape and are decentrally arranged on an axial end of the two differential bolts 9a, 9b. For example, the locating section 11 is a rectangular breakthrough, wherein the ridge sections 21a, 21b are arranged in the locating section 11 in a form-locking manner.

The main differential bolt 10 and the two differential bolts 9a, 9b or the ridge sections 21a, 21b include a further fixing section 22 in the area of the locating section 11. The further fixing section 22 is, for example, a bore hole, wherein the further fixing section 22 extends along the main axis H. The fixing section 22 extends in the axial direction with respect to the main axis H through the main differential bolt 10 and through the two ridge sections 21a, 21b, and so a through hole is formed. In the exemplary embodiment shown, the retaining means 13, preferably a retaining pin, is arranged in the further fixing section 22. For example, instead of the retaining means 13, a cylindrical bolt or a grub bolt is arranged in the fixing section 22.

The contact sections 20a, 20b and/or the ridge sections 21a, 21b secure the differential bolts 9a, 9b against turning. The differential bolts 9a, 9b are secured in the radial direction with respect to the axis of rotation R or the main axis H with the aid of the retaining means 13.

FIG. 17 shows a three-dimensional detailed view of the bolt body 6. For example, the first contact section 20a and/or the second contact section 20b are/is a cylindrical flattening on both sides. The contact sections 20a, 20b rest, in the axial direction with respect to the main axis H, against the locating section 11 and form a form-locking connection with the locating section 11.

Modifications and variations can be made to the embodiments illustrated or described herein without departing from the scope and spirit of the invention as set forth in the appended claims.

LIST OF REFERENCE CHARACTERS 1 differential device
2a first half-shaft
2b second half-shaft
3 differential housing
3a first differential housing section
3b second differential housing section
4 bolt receptacle
5 differential spider
6 bolt body
7a first bolt section
7b second bolt section
7c third bolt section
7d fourth bolt section
8a first bevel gear
8b second bevel gear
8c third bevel gear
8d fourth bevel gear
9a first differential bolt
9b second differential bolt
10 main differential bolt
11 locating section
12 fixing section
13 retaining means
14a first side gear
14b second side gear
15 fastening section
16a first fastening subsection
16b second fastening subsection
17 further retaining means
18a bolting means
18b nut
19 further bolting means
20a first contact section
20b second contact section
21a first ridge section
21b second ridge section
22 further fixing section
R axis of rotation
H main axis

The invention claimed is:

1. A differential (1), comprising:
a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and
a differential housing (3), the differential spider (5) arranged in the differential housing (3), the differential housing (3) defining an axis of rotation (R),
wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and
wherein the main differential bolt (10) comprises a locating section (11), and the differential bolts (9a, 9b) are accommodated in the locating section (11),
wherein the differential bolts (9a, 9b) are positioned against each other in the locating section (11),
wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11), and
wherein the two differential bolts (9a, 9b) are connected to one or more of the differential housing (3), the main differential bolt (10), and each other via at least one bolting means (18a, 19).

2. The differential (1) of claim 1, wherein the main differential bolt (10) is a continuous and/or one-piece bolt.

3. The differential (1) of claim 1, wherein:
the two differential bolts (9a, 9b) each comprise a fixing section (12) at axial ends of the two differential bolts (9a, 9b); and
each of the fixing sections (12) of the two differential bolts (9a, 9b) is a passage opening along a longitudinal axis of the differential bolts (9a, 9b), and the bolting means (18a) is guided through the fixing sections (12) of the two differential bolts (9a, 9b) and connects the two differential bolts (9a, 9b) to each other.

4. The differential (1) of claim 1, wherein:
the differential housing (1) comprises at least one fastening section (15) on a radial outer side of the differential housing (1) with respect to the axis of rotation (R);

the two differential bolts (9a, 9b) each comprise a fixing section (12) at axial ends of the two differential bolts (9a, 9b);

the fastening section (15) of the differential housing (1) is a first opening extending in parallel to the axis of rotation (R);

each of the fixing sections (12) of the two differential bolts (9a, 9b) is a second opening extending in parallel to the axis of rotation (R);

the bolting means (19) is guided through one or more of the fixing sections (12) of the two differential bolts (9a, 9b) and the fastening section (15) of the differential housing (1); and one or more of the fastening section (15) of the differential housing (1) and the fixing sections (12) of the two differential bolts (9a, 9b) include an internal thread, and the bolting means (19) is engaged with the internal thread.

5. A vehicle comprising the differential (1) of claim 1.

6. The differential (1) of claim 1, wherein the main differential bolt (10) is not secured to the differential housing (1) by a securing means.

7. A differential (1), comprising:

a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and a differential housing (3), the differential spider (5) arranged in the differential housing (3), the differential housing (3) defining an axis of rotation (R), wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and wherein the main differential bolt (10) comprises a locating section (11), and the differential bolts (9a, 9b) are accommodated in the locating section (11), wherein the differential bolts (9a, 9b) are positioned against each other in the locating section (11), wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11), and wherein the two differential bolts (9a, 9b) are connected to one or more of the differential housing (3), the main differential bolt (10), and each other via at least one interference fit.

8. A differential (1), comprising:

a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and a differential housing (3), the differential spider (5) arranged in the differential housing (3), the differential housing (3) defining an axis of rotation (R), wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and wherein the main differential bolt (10) comprises a locating section (11), and the differential bolts (9a, 9b) are accommodated in the locating section (11), wherein the differential bolts (9a, 9b) are positioned against each other in the locating section (11), wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11), wherein the two differential bolts (9a, 9b) are connected to one or more of the differential housing (3), the main differential bolt (10), and each other via at least one securing means, wherein the differential housing (1) comprises at least one fastening section (15) on a radial outer side of the differential housing (1) with respect to the axis of rotation (R), wherein the two differential bolts (9a, 9b) each comprise a fixing section (12) at axial ends of the two differential bolts (9a, 9b), wherein the fastening section (15) of the differential housing (1) is a first opening extending in parallel to the axis of rotation (R), wherein each of the fixing sections (12) of the two differential bolts (9a, 9b) is a second opening extending in parallel to the axis of rotation (R), wherein the securing means (13) is guided through one or more of the fastening section (15) of the differential housing (1) and the fixing sections (12) of the two differential bolts (9a, 9b), and wherein an additional securing means (17) is guided through one or more of the fastening section (15) of the differential housing (1), the fixing sections (12) of the two differential bolts (9a, 9b) and the securing means (13).

9. A differential (1), comprising:

a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and a differential housing (3), the differential spider (5) arranged in the differential housing (3), the differential housing (3) defining an axis of rotation (R), wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and wherein the main differential bolt (10) comprises a locating section (11), and the differential bolts (9a, 9b) are accommodated in the locating section (11), wherein the differential bolts (9a, 9b) are positioned against each other in the locating section (11), wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11), and wherein the two differential bolts (9a, 9b) are connected to one or more of the differential housing (3), the main differential bolt (10), and each other via at least one plug connection.

10. A differential (1), comprising:
a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and
a differential housing (3), the differential spider (5) arranged in the differential housing (3), the differential housing (3) defining an axis of rotation (R),
wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d),
wherein the main differential bolt (10) comprises a locating section (11), and the differential bolts (9a, 9b) are accommodated in the locating section (11),
wherein the differential bolts (9a, 9b) are positioned against each other in the locating section (11),
wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11),
wherein the two differential bolts (9a, 9b) are connected to one or more of the differential housing (3), the main differential bolt (10), and each other via at least one plug connection,
wherein the differential housing (1) comprises at least one fastening section (15) on a radial outer side of the differential housing (1) with respect to the axis of rotation (R),
wherein the two differential bolts (9a, 9b) each comprise a fixing section (12) at axial ends of the two differential bolts (9a, 9b),
wherein each of the fixing sections (12) of the two differential bolts (9a, 9b) is a recess,
wherein the fastening section (15) of the differential housing (1) is a first opening extending in parallel to the axis of rotation (R),
wherein the securing means (13) is guided through the fastening section (15) of the differential housing (1) and the fixing sections (12) of the two differential bolts (9a, 9b), and
wherein the fixing sections (12) of the two differential bolts (9a, 9b) forming a stop for the securing means (13) in one or both of the axial direction and the radial direction with respect to the axis of rotation (R).

11. A differential (1), comprising:
a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and
a differential housing (3), the differential spider (5) arranged in the differential housing (3), the differential housing (3) defining an axis of rotation (R),
wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and
wherein the main differential bolt (10) comprises a locating section (11), and the differential bolts (9a, 9b) are accommodated in the locating section (11),
wherein the differential bolts (9a, 9b) are positioned against each other in the locating section (11),
wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11),
wherein the main differential bolt (10) and the two differential bolts (9a, 9b) further comprise a fixing section (22) proximate the locating section (11),
wherein the two differential bolts (9a, 9b) each comprise at least one ridge section (20a, 20b),
wherein the two ridge sections (20a, 20b) are accommodated in the locating section (11), and
wherein the securing means (13) connects the locating section (11) to the two ridge sections (21a, 21b) via the fixing section (22).

12. The differential (1) of claim 11, wherein the two differential bolts (9a, 9b) each comprise at least one contact section (20a, 20b), and the contact sections (20a, 20b) and the locating section (11) form a positive engagement.

13. A differential (1), comprising:
a differential spider (5) that comprises a bolt body (6) with four bolt sections (7a, 7b, 7c, 7d) and four bevel gears (8a, 8b, 8c, 8d), the bevel gears (8a, 8b, 8c, 8d) mounted to the bolt sections (7a, 7b, 7c, 7d); and
a differential housing (3), the differential spider (5) arranged in the differential housing (3), the differential housing (3) defining an axis of rotation (R),
wherein the bolt body (6) further comprises a main differential bolt (10) and two differential bolts (9a, 9b), the main differential bolt (10) including two bolt sections (7c, 7d) of the four bolt sections (7a, 7b, 7c, 7d), each of the two differential bolts (9a, 9b) including a respective bolt section of the other two bolt sections (7a, 7b) of the four bolt sections (7a, 7b, 7c, 7d), and
wherein the main differential bolt (10) comprises a locating section (11), and the differential bolts (9a, 9b) are accommodated in the locating section (11),
wherein the differential bolts (9a, 9b) are positioned against each other in the locating section (11),
wherein an end of each of the differential bolts (9a, 9b) positioned within the locating section (11) is locked to the main differential bolt (10) at the locating section (11) such that the differential bolts (9a, 9b) are rotationally fixed relative to the main differential bolt (10) at the locating section (11), and
wherein the two differential bolts (9a, 9b) are connected to each other with a bolting means (18a) and a nut (18b), the bolting means (18a) and nut (18b) apply a force to the two differential bolts (9a, 9b) in a radial direction with respect to the axis of rotation (R), and the end of each of the differential bolts (9a, 9b) positioned within the locating section (11) forms an interference fit with the locating section 11 to rotationally fix the differential bolts (9a, 9b) relative to the main differential bolt (10) at the locating section (11).

14. The differential (1) of claim 13, wherein the end of each of the differential bolts (9a, 9b) positioned within the locating section (11) is a tapered or conical end.

* * * * *